United States Patent
Akers et al.

(10) Patent No.: US 10,915,264 B2
(45) Date of Patent: Feb. 9, 2021

(54) APPARATUS, SYSTEMS, AND METHODS TO RECLAIM STORAGE ASSOCIATED WITH CACHED DATA

(71) Applicant: Intel Corporation, Santa Clara, CA (US)

(72) Inventors: Jason Akers, Beaverton, OR (US); Chace Clark, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/381,914

(22) Filed: Apr. 11, 2019

(65) Prior Publication Data
US 2019/0235785 A1   Aug. 1, 2019

(51) Int. Cl.
*G06F 3/06* (2006.01)
(52) U.S. Cl.
CPC .......... *G06F 3/0652* (2013.01); *G06F 3/0604* (2013.01); *G06F 3/0659* (2013.01); *G06F 3/0679* (2013.01)
(58) Field of Classification Search
CPC .... G06F 3/0652; G06F 3/0604; G06F 3/0659; G06F 3/0679

USPC ........................................................ 711/166
See application file for complete search history.

(56) References Cited

U.S. PATENT DOCUMENTS 9,842,053 B2 * 12/2017 Joshi ................... G06F 12/0804

* cited by examiner

*Primary Examiner* — Hua J Song
(74) *Attorney, Agent, or Firm* — Schwabe, Williamson & Wyatt, P.C.

(57) ABSTRACT

Embodiments are directed towards apparatuses, methods, and systems associated with a storage reclamation manager that generates a command to reclaim storage locations to assist in management of a storage capacity of a primary storage device. In embodiments, the command is a trim command to inform the storage device of storage locations including invalid data. In embodiments, the command is generated during performance of operations associated with a write-back operation where a cache coupled with the processor stores a first portion of data and the primary storage device stores a corresponding second portion of data. In embodiments, the command is generated during or after a write-back operation of a third portion of data into the cache device. In embodiments, the command assists in reclamation of storage locations in which the second portion of data is stored, to assist in management of a storage capacity of the primary storage device. Additional embodiments may be described and claimed.

15 Claims, 9 Drawing Sheets

APPARATUS, SYSTEMS, AND METHODS TO RECLAIM STORAGE ASSOCIATED WITH CACHED DATA

FIELD

Embodiments of the present disclosure generally relate to the field of integrated circuits (IC), and more particularly, to write operation techniques related to caching for storage devices including solid state drives (SSDs).

BACKGROUND

Write-back cache, also sometimes known as copy-back cache, is a storage method often used to reduce latency and increase throughput, especially for write-intensive applications. For example, during a write-back operation, modifications to data are written to the cache, (e.g., a solid state drive (SSD) cache device) but not copied to the primary storage or backing storage (e.g., also one or more SSDs but may also include other types of primary or backing storage, including rotational media and the like) device until a later time. Accordingly, the cache naturally absorbs incoming write operations, resulting in reduced write amplification associated with, e.g., the cache SSD or primary storage SSD. Write-back methods increase system speed, as it is faster to write data into the cache alone, as opposed to writing the same data into both the cache and backing storage device at the same time (e.g., as in a write-through cache operation). Write-back cache alone, however, may not be sufficient to meet increasing market demand for enhanced storage endurance and does not always promote more efficient usage of internal device buffers. Endurance and performance may continue to be limiting metrics for many storage solutions, especially those based upon solid state drives (SSDs), in particular SSDs that include NAND memory such as multi-level cell (MLC) NAND, in particular, quad-level cell (QLC) NAND.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
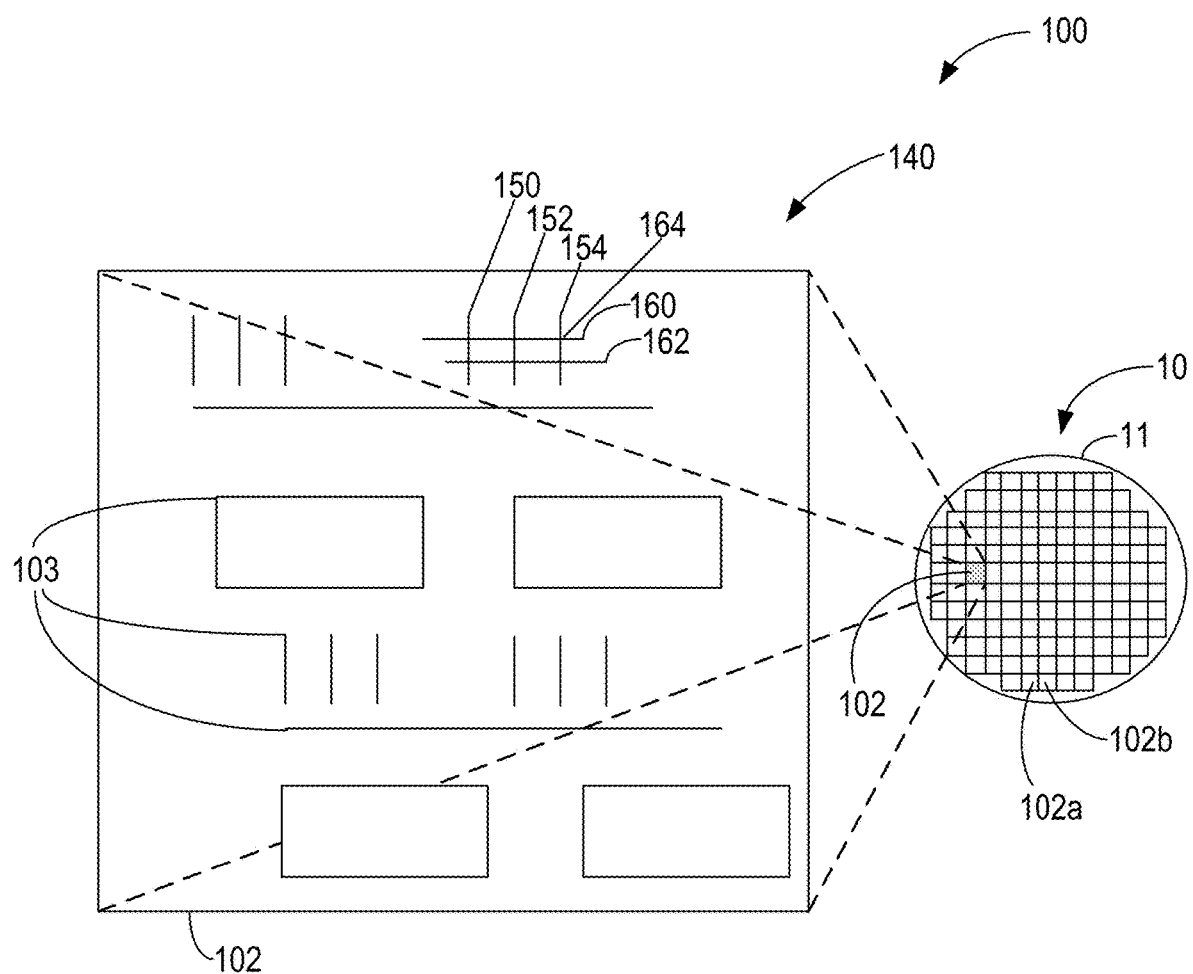
FIG. 1 illustrates an example die that may include storage locations of a memory device, e.g., a primary storage device or cache device, in accordance with embodiments of the present disclosure.

Embodiments described include methods, apparatuses, and systems to assist in management of a storage capacity by reclaiming storage locations in a primary storage device during a write-back operation. In embodiments, a storage reclamation manager is communicatively coupled with a cache that stores a first portion of data, and a primary storage device that stores a corresponding second portion of data. In embodiments, during a write-back operation of a third portion of data into the cache, the storage reclamation manager is to generate a command to the primary storage device to free storage locations by indicating the storage locations as invalid and/or otherwise assisting in reclamation of storage locations in which the second portion of data is stored. In embodiments, the command includes a command to trim invalid data ("trim command"), e.g., an Advanced Technology Attachment (ATA) Packet Interface TRIM or Small Computer System Interface (SCSI) unmap ("UN-MAP") command or Non-Volatile Memory Express (NVMe) Dataset Management Deallocate command.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

FIG. 1 illustrates an example die that may include storage locations of a primary storage device or cache device in connection with techniques of the present disclosure, in accordance with some embodiments. More specifically, FIG. 1 schematically illustrates an integrated circuit assembly (IC) assembly 100 including a top view of die 102 in wafer form 10 and in singulated form 140, in accordance with some embodiments. In some embodiments, the die 102 may be one of a plurality of dies (e.g., die 102, 102a, 102b) of a wafer 11 composed of semiconductor material such as, for example, silicon or other suitable material. The plurality of dies may be formed on a surface of the wafer 11. Each of the dies may be a repeating unit of a semiconductor product that may form a memory device. For example, die 102 may include circuitry 103 and/or another memory device module or component as described herein in accordance with some embodiments. According to various embodiments, the circuitry 103 may include one or more memory elements (memory cells, such as, e.g., multi-level per cell (MLC) memory cells), which may be configured in an array, such as a two-dimensional (2D) or three-dimensional (3D) non-volatile MLC memory array. In some embodiments, the memory array may comprise a 2D or 3D multi-level per cell such as three-level-per-cell (TLC) or four-level-per-cell (QLC) NAND memory array. In some embodiments, the memory array comprises a cross-point memory array.

The circuitry 103 may further include one or more wordline(s) (also referred to as "WL" or "WLs") (e.g., 150, 152, 154) and one or more bitline(s) (also referred to as "BL" or "BLs") (e.g., 160, 162) coupled to the memory elements. Only three wordlines and two bitlines are shown in FIG. 1 for ease of understanding. In some embodiments, the bitlines and wordlines may be configured such that each of the memory elements may be disposed at an intersection (e.g., 164) of each individual bitline and wordline (e.g., 160 and 154), in a cross-point configuration. A voltage or bias can be applied to a target memory element of the memory elements using the wordlines and the bitlines to select the target memory cell for a read or write operation. Bitline drivers may be coupled to the bitlines and wordline drivers may be coupled to the wordlines to facilitate decoding/selection of the memory elements. To enable memory cell selection, the wordlines 150, 152, 154 may be connected with memory cells and other parts of circuitry 103 via interconnects, including respective contact structures (e.g., vias) that provide electrical connectivity through the layers of the die 102 as described below in greater detail. It is noted that the circuitry 103 is only schematically depicted in FIG. 1 and may represent a wide variety of suitable logic or memory in the form of circuitry or other suitable devices and configurations including, for example, one or more state machines including circuitry and/or instructions in storage (e.g., firmware or software) configured to perform actions such as including write-back operations in connection with reclamation of storage locations as described herein.

In some embodiments, circuitry 103 may be formed using suitable semiconductor fabrication techniques, some of which are described herein. After a fabrication process of the semiconductor product is complete, the wafer 11 may undergo a singulation process in which each of the dies (e.g., die 102) may be separated from one another to provide discrete "chips" of the semiconductor product. The wafer 11 may be any of a variety of sizes. According to various embodiments, the circuitry 103 may be disposed on a semiconductor substrate in wafer form 10 or singulated form 140. In some embodiments, the die 102 may include storage locations of a cache device or a primary storage device, in accordance with embodiments described further below.

Figure 2:
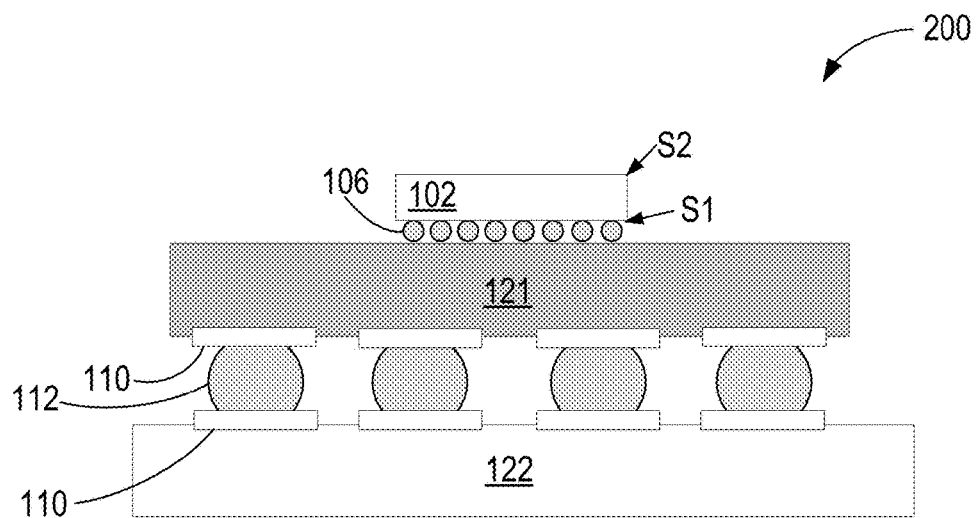
FIG. 2 schematically illustrates a cross-section side view of an integrated circuit (IC) assembly that may be included in the memory device of FIG. 1, in accordance with embodiments of the present disclosure.

FIG. 2 schematically illustrates a cross-section side view of an example integrated circuit (IC) assembly 200 that may be included in a memory device, e.g., a primary storage device or cache device, provided in accordance with some embodiments described herein. In some embodiments, the IC assembly 200 may include one or more dies electrically and/or physically coupled with a package substrate 121. The die 102 may include circuitry (e.g., circuitry 103 of FIG. 1) and/or other suitable components or modules to perform operations in connection with temperature management of a memory device as described herein. In some embodiments, the package substrate 121 is coupled with a circuit board 122, as shown.

The IC assembly 200 may include a wide variety of configurations including, for example, suitable combinations of flip-chip and/or wire-bonding configurations, interposers, multi-chip package configurations including System in Package (SiP) and/or Package on Package (PoP) configurations. For example, the die 102 can be attached to the package substrate 121 according to a wide variety of suitable configurations including, for example, being directly coupled with the package substrate 121 in a flip-chip configuration, as depicted. In the flip-chip configuration, an active side, S1, of the die 102 including active circuitry is attached to a surface of the package substrate 121 using die-level interconnect structures 106 such as bumps, pillars, or other suitable structures that may also electrically couple the die 102 with the package substrate 121. The active side S1 of the die 102 may include circuitry such as, for example, memory elements as described in reference to FIG. 1. An inactive side, S2, may be disposed opposite to the active side S1, as can be seen. In other embodiments, the die 102 may be disposed on another die that is coupled with the package substrate 121 in any of a variety of suitable stacked die configurations. For example, a processor die may be coupled with the package substrate 121 in a flip-chip configuration and the die 102 may be mounted on the processor die in a flip-chip configuration and electrically coupled with the package substrate 121 using through-silicon vias (TSVs) formed through the processor die. In still other embodiments, the die 102 may be embedded in the package substrate 121 or coupled with a die that is embedded in the package substrate 121. Other dies may be coupled with the package substrate 121 in a side-by-side configuration with the die 102 in other embodiments.

In some embodiments, the die-level interconnect structures 106 may be configured to route electrical signals between the die 102 and the package substrate 121. The electrical signals may include, for example, input/output (I/O) signals and/or power/ground signals that are used in connection with operation of the die. The die-level interconnect structures 106 may be coupled with corresponding die contacts disposed on the active side S1 of the die 102 and corresponding package contacts disposed on the package substrate 121. The die contacts and/or package contacts may include, for example, pads, vias, trenches, traces and/or other suitable contact structures, fabrication of some of which is described below.

In some embodiments, the package substrate 121 may comprise an epoxy-based laminate substrate having a core and/or build-up layers such as, for example, an Ajinomoto Build-up Film (ABF) substrate. The package substrate 121 may include other suitable types of substrates in other embodiments including, for example, substrates formed from glass, ceramic, or semiconductor materials.

The package substrate 121 may include electrical routing features configured to route electrical signals to or from the die 102. The electrical routing features may include, for example, package contacts (e.g., pads 110) disposed on one or more surfaces of the package substrate 121 and/or internal routing features (not shown) such as, for example, trenches, vias, or other interconnect structures to route electrical signals through the package substrate 121.

In some embodiments, the package substrate 121 may be coupled with a circuit board 122, as can be seen. The circuit board 122 may be a printed circuit board (PCB) composed of an electrically insulative material such as an epoxy laminate. For example, the circuit board 122 may include electrically insulating layers composed of materials that may be laminated together. Interconnect structures (not shown) such as traces, trenches, or vias may be formed through the electrically insulating layers to route the electrical signals of the die 102 through the circuit board 122. The circuit board 122 may be composed of other suitable materials in other embodiments. In some embodiments, the circuit board 122 may be a motherboard and may be included in a computing device, such as, for example, a mobile device. Package-level interconnects such as, for example, solder balls 112 may be coupled to pads 110 on the package substrate 121 and/or on the circuit board 122 to form corresponding solder joints that may be configured to further route the electrical signals between the package substrate 121 and the circuit board 122. The pads 110 may be composed of any suitable electrically conductive material such as metal. The package-level interconnect may include other structures and/or configurations including, for example, land-grid array (LGA) structures and the like. In embodiments, the die 102 of the IC assembly 200 may be, include, or be a part of an IC included in a memory device, such as, e.g., a memory device that includes a cache device or a primary storage device to store portions of data in connection with a write-back operation (e.g., one or more of a first, second, third, or fourth portion of data as described in connection with FIGS. 3-6 described below).

Figure 3:
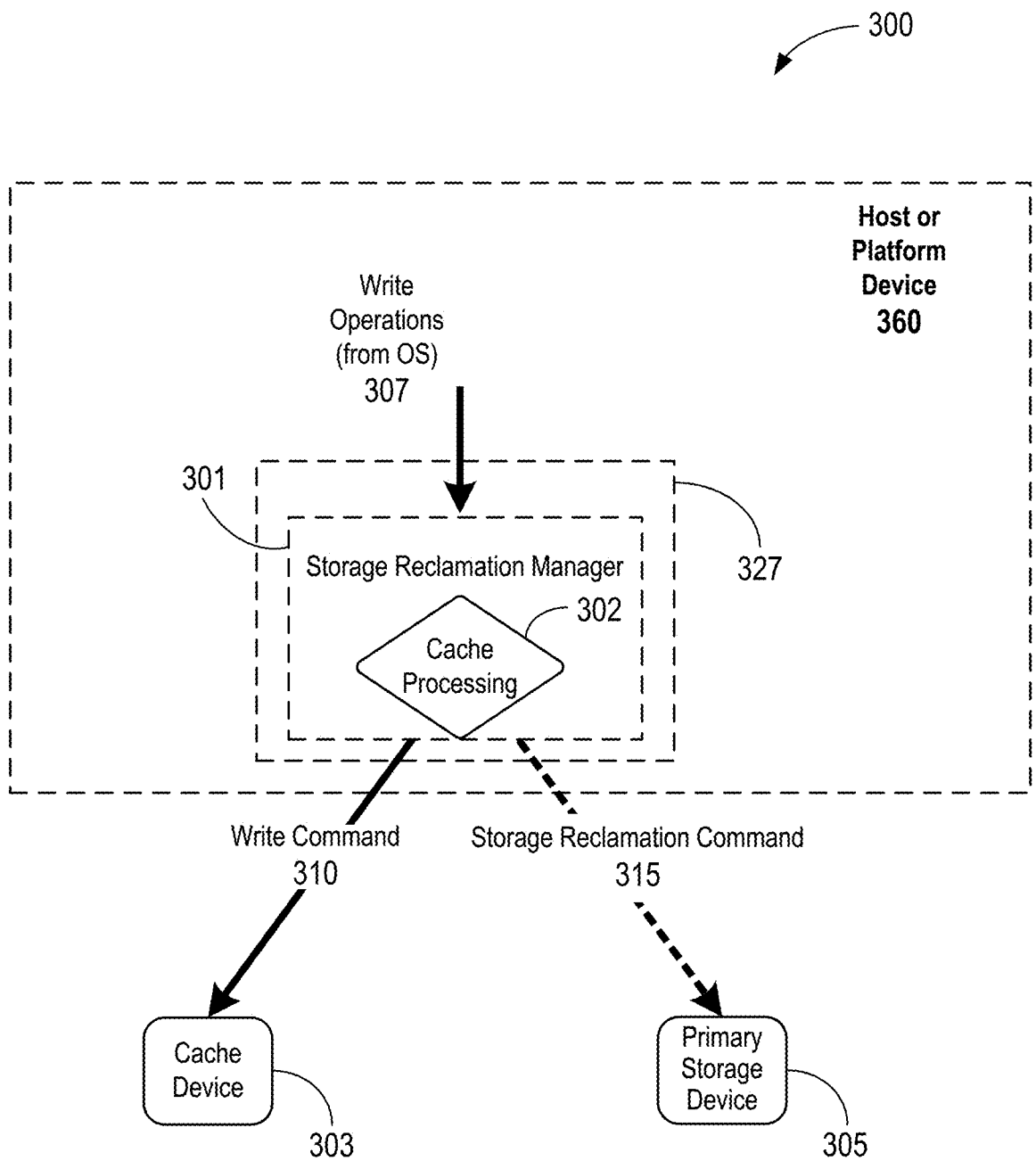
FIG. 3 is an example diagram illustrating an overview of storage reclamation operations associated with a primary storage device and a cache device, in accordance with embodiments of the present disclosure.

FIG. 3 is an example diagram 300 illustrating an overview of storage reclamation operations associated with a primary storage device and a cache device, in accordance with embodiments. In embodiments, operations are associated with a write-back operation where the cache device is to store new data and a primary storage device is to later store the new data. In embodiments, the primary storage device is to store the new data at a designated time after the write-back operation. The embodiment of FIG. 3 illustrates a host or platform device 360 (e.g., a platform or host processor), a platform memory interface 327 including a storage reclamation manager 301, a write-back cache device or cache 303, and a backing storage or primary storage device 305. As shown, in embodiments, storage reclamation manager 301 receives one or more write operation requests ("write operations") 307 from a host device (e.g., an operating system (OS) of host or platform device 360). In embodiments, platform memory interface 327 includes an OS driver, such as a storage controller, and may include a component including storage reclamation manager 301. In embodiments, after receiving write operations 307, storage reclamation manager 301 then performs cache processing at 302 and generates a write command 310 to write a portion of data to cache 303.

In embodiments, at a same or similar time, storage reclamation manager 301 generates a storage reclamation command 315 to inform primary storage device 305 of storage locations that no longer correspond to valid data and thus are to be reclaimed. Thus, in embodiments, storage reclamation command 315 is a trim command to trim invalid frames of data (also known as dirty frames). For example, as noted above, the trim command may be similar or the same as a TRIM command of a command set of the interface standard, Advanced Technology Attachment (ATA) Packet Interface. In other embodiments, the command is an UNMAP command of the Small Computer System Interface (SCSI) standard. In other embodiments, the command is a Dataset Management Deallocate command of the NVM Express (NVMe) standard. In embodiments, the trim command can be any suitable command to assist a primary storage device in management of a storage capacity of the storage device. In embodiments, the command informs the primary storage device of the addresses of invalid data and assists with garbage collection, storage optimization functions, and the like. Note that in embodiments, cache 303 includes any suitable non-volatile memory (NVM) device that may be used to accelerate read and/or write operations of a primary storage device. In some embodiments, cache 303 includes a SSD including a non-volatile persistent phase-change memory (e.g., PCM) device. In various embodiments, cache 303 includes a cross-point memory array device that includes, for example, 3D XPOINT™ or OPTANE™ related technology. In other embodiments, cache 303 includes NAND technology such as Single Level Cell (SLC) NAND or related technology. In other embodiments, cache 303 includes a volatile memory device and in some embodiments includes static RAM (SRAM) or dynamic RAM (DRAM). In some embodiments, storage reclamation manager 301 performs cache processing while in other embodiments, storage reclamation manager 301 issues the write command or storage reclamation command to cache processing 302, which may be performed by another entity located in a device different or separate from storage reclamation manager 301.

Figure 9:
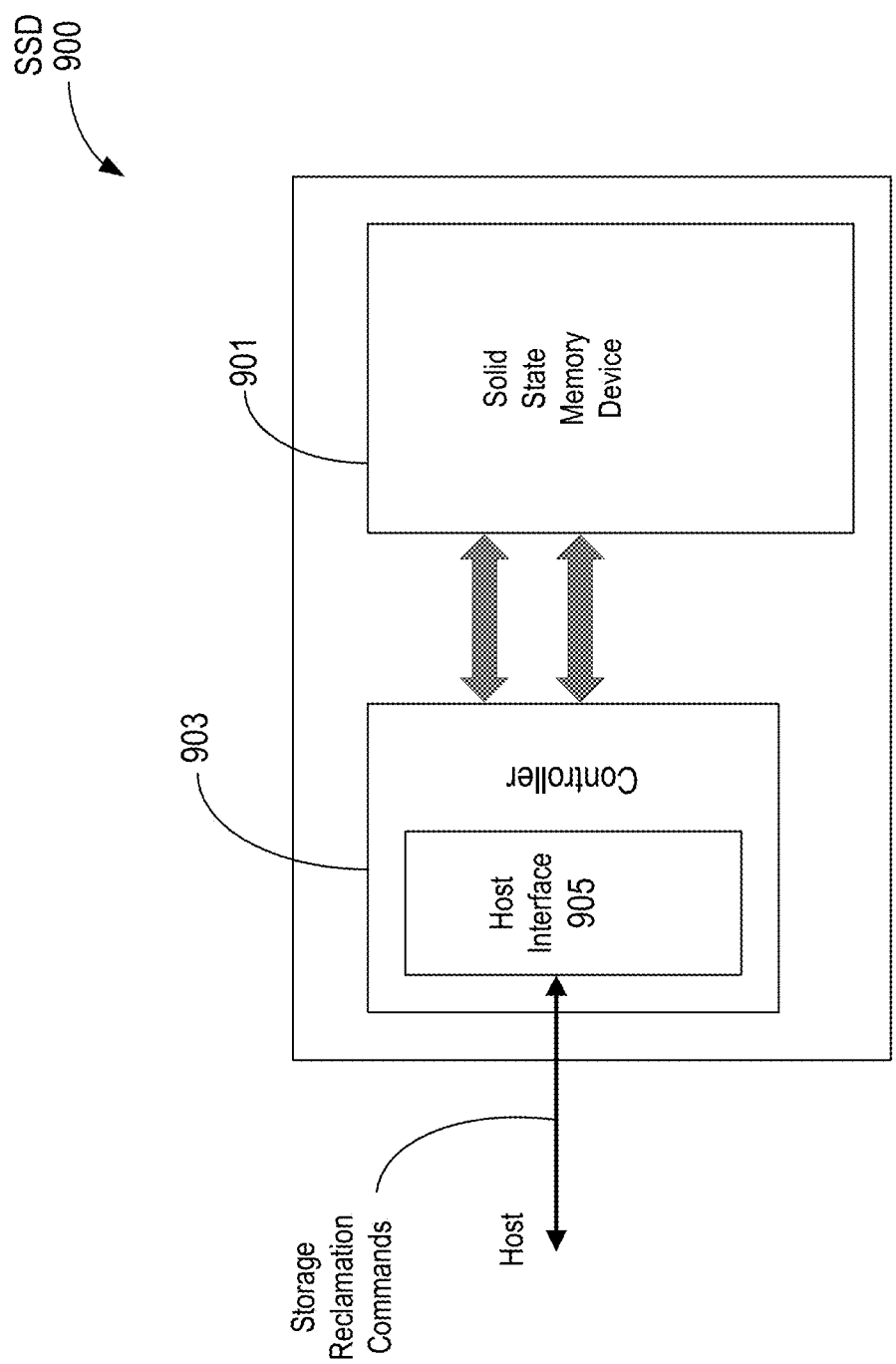
FIG. 9 illustrates an example solid state drive (SSD) that may include the cache memory device and/or primary storage device of FIGS. 3-5, in accordance with embodiments of the present disclosure.

Note that in some embodiments, cache 303 and primary storage device 305 are included in a single SSD (e.g., see FIG. 9).

Figure 4:
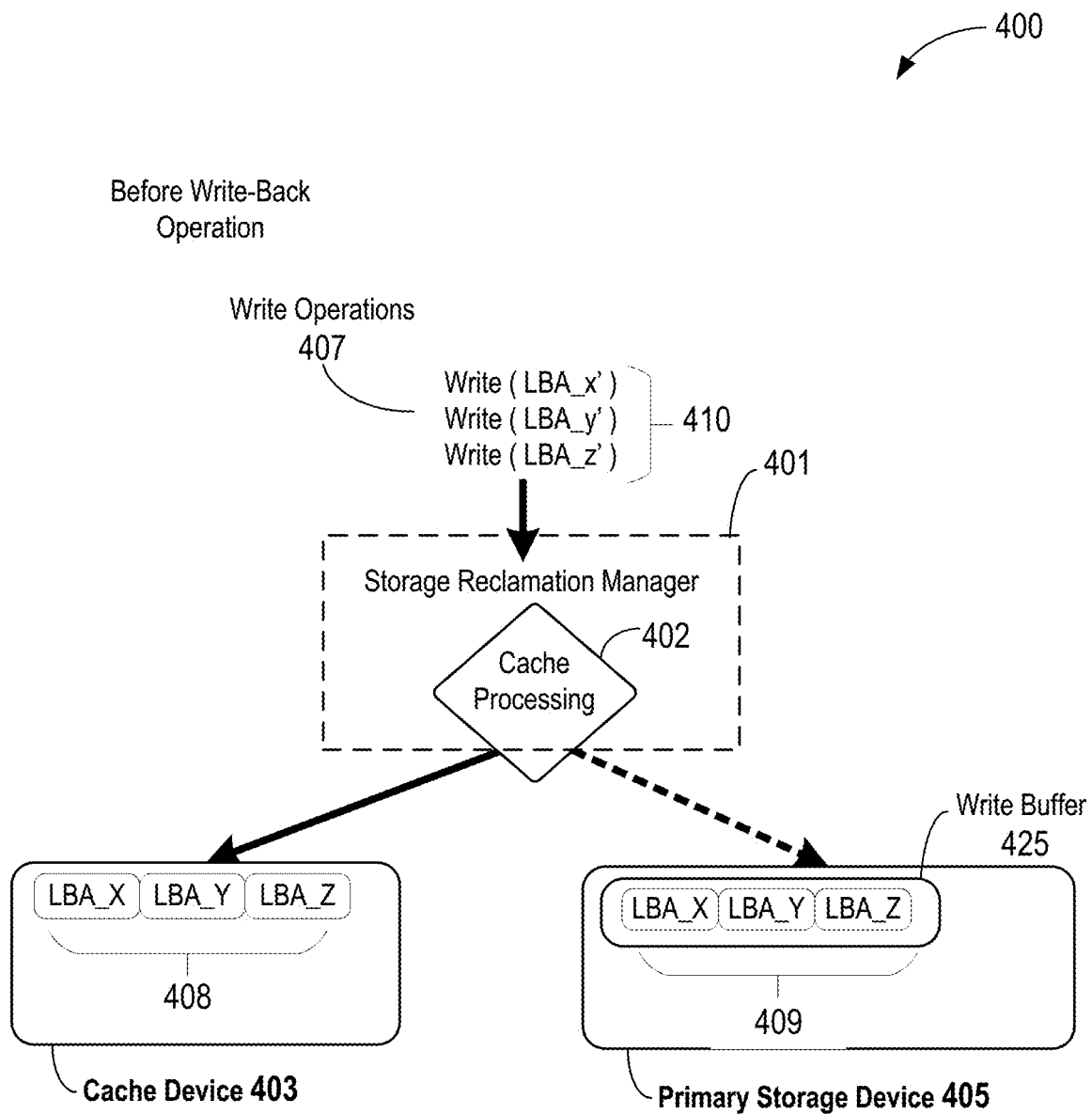
FIGS. 4 and 5 are example diagrams illustrating in further detail the storage reclamation operations of FIG. 3, in accordance with embodiments of the present disclosure.
Figure 5:
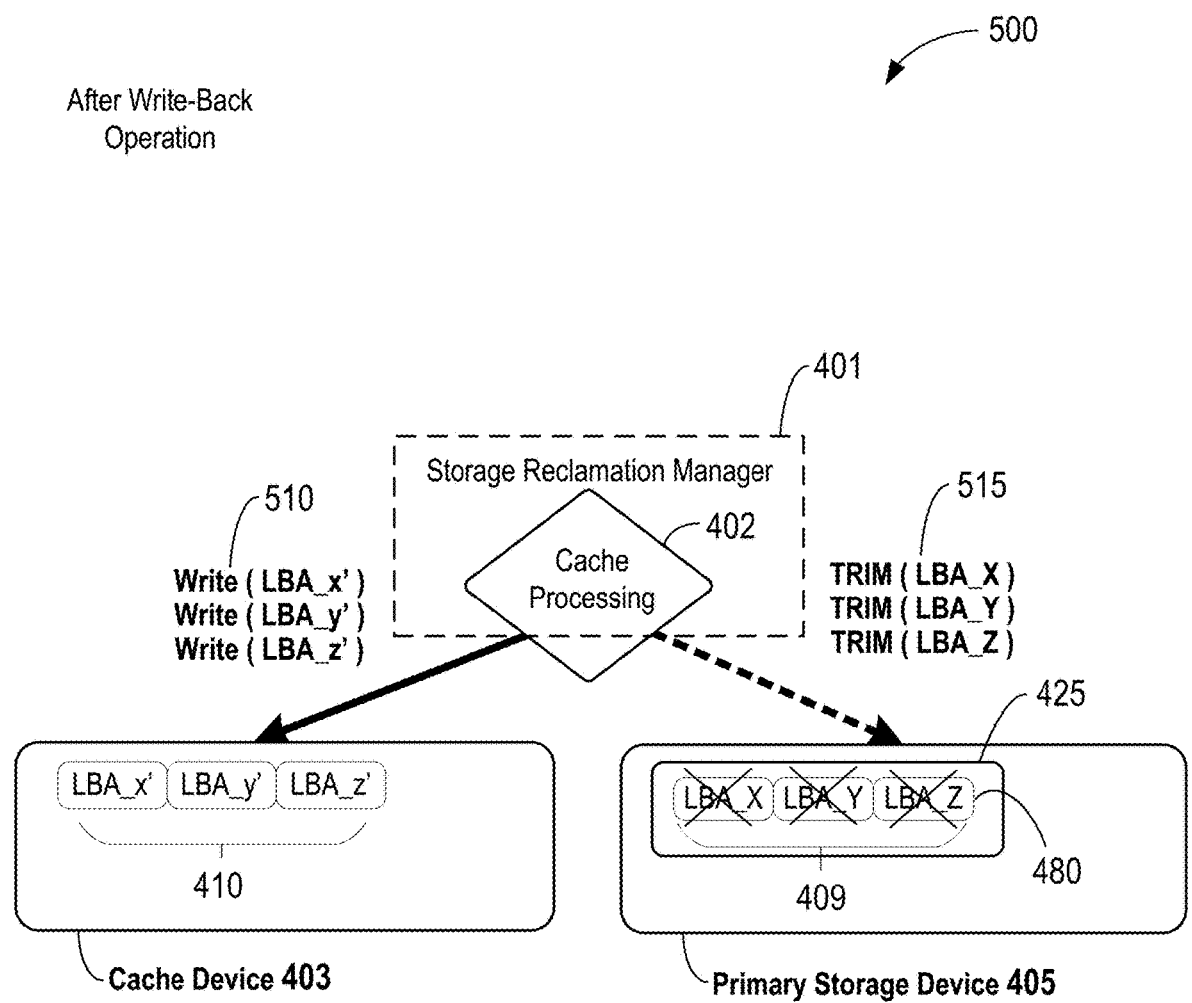

Referring now to FIGS. 4 and 5, which are example block diagrams illustrating in further detail embodiments associated with FIG. 3. Accordingly, FIG. 4 illustrates storage locations of portions of data prior to, e.g., the example write-back operation of FIG. 3, while FIG. 5 illustrates storage locations of portions of the data after the example write-back operation of FIG. 3. In embodiments, a cache device or cache 403 stores one or more first portions of data 408 and a primary storage device 405 stores a second portion of data 409 that corresponds to first portion of data 408. In embodiments, second portion of data 409 is identical to, or includes a copy of, the first portion of data 408. Accordingly as shown, first portion of data 408, e.g., LBA_X, LBA_Y, and LBA_Z, is clean and is stored or included in storage locations of cache 403, and corresponding second portion of data 409, which is a copy of LBA_X, LBA_Y, and LBA_Z, is also clean and included in storage locations of primary storage device 405. In some embodiments, as shown, second portion of data 409 is stored in an internal write buffer 425 (or other internal cache) of primary storage device 405. In embodiments, as shown, prior to, e.g., a write-back operation, write operation requests ("Write Operations") 407 are received by a storage reclamation manager 401, from a host device. In embodiments, write operation requests 407 include a request to write a third portion of data 410, e.g., LBA_x', LBA_y', and LBA_z', into cache device 403. In embodiments, storage reclamation manager 401 is to perform cache processing 402 on third portion of data 410 that is to modify or replace first portion of data 408 of cache device 403.

Next, as shown in diagram 500 of FIG. 5, upon or after receiving write operation requests 407 of FIG. 4, storage reclamation manager 401 generates both write command 510 and a storage reclamation command 515. Accordingly, as shown in FIG. 5, storage reclamation manager 401 performs cache processing 402 and subsequently issues write command 510 to cache device 403. Accordingly, in embodiments, during the write-back operation, third portion of data 410, e.g., LBA_x', LBA_y', LBA_z', is stored or written into cache device 403. At a similar or same time, storage reclamation manager 401 generates storage reclamation command 515 (e.g., TRIM LBA_X, LBA_Y, LBA_Z) to be received by primary storage device 405. In embodiments, storage reclamation command 515 informs a memory controller of primary storage device 405 of addresses of second portion of data 409 and that second portion of data 409 includes invalid or dirty data 480.

Accordingly, in embodiments, storage reclamation command 515 assists in reclamation of storage locations in which a portion of data that is invalid (e.g., second portion of data 409) is stored, to free corresponding storage locations or otherwise assist in management of a storage capacity of a primary storage device. In embodiments, storage reclamation command 515 includes a TRIM, UNMAP, Deallocate, or similar command associated with storage optimization of a backing storage or primary storage device. In embodiments, storage locations in regions of an internal cache (e.g., write buffer) of a primary storage device that store invalid data are designated as including dirty or invalid data. In some embodiments, in response to storage reclamation command 515, invalid data included in single-level cell (SLC) regions of a write buffer of primary storage device 405 are removed. In embodiments, a copy of new data to be stored in the cache is to be stored in a primary storage device at a later or designated time after the write-back operation. Accordingly, with respect to FIGS. 3 and 4, a fourth portion of data (i.e., a copy of third portion of data 410) to correspond to third portion of data 410 is to be stored in primary storage device 405 at a later or designated time after the write-back operation.

Note that in some embodiments, storage reclamation manager 401 issues storage reclamation command 515 at a same or similar time as write command 510. In other embodiments, a timing of issuance of storage reclamation command 515 with respect to write command 510 varies. For example, in embodiments, storage reclamation command 515 is generated by storage reclamation manager 401, and is stored until a later time to be issued along with one or more additional storage reclamation commands that are associated with other write-back operations.

Figure 6:
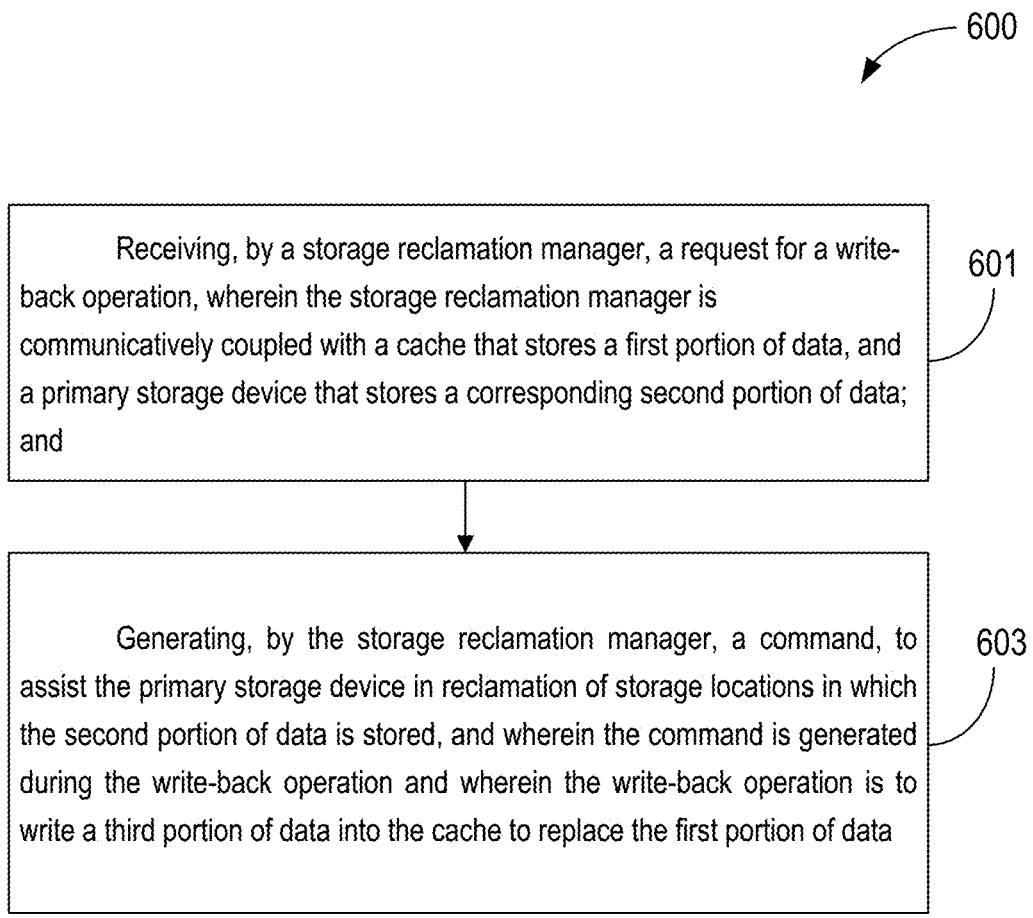
FIG. 6 is a flow diagram associated with embodiments of FIGS. 4 and 5, in accordance with embodiments of the present disclosure.

FIG. 6 is a flow diagram illustrating an example process 600, which may be implemented in accordance with embodiments of the present disclosure. In some embodiments, process 600 may be implemented by a storage reclamation manager, such as e.g., storage reclamation manager 301 of FIG. 3. In embodiments, as noted previously, storage reclamation manager includes a component of platform memory interface (e.g., 327 of FIG. 3) that may include, e.g., a device driver component of an OS of a host device. In embodiments, at a first block 601, process 600 includes receiving a request from a host device for a write-back operation. Note that in embodiments, the storage reclamation manager is communicatively coupled with a cache that stores a first portion of data, and the primary storage device that stores a corresponding second portion of data. At a next block 603, in embodiments, process 600 includes generating a command, to assist the primary storage device in reclamation of storage locations in which the second portion of data is stored. In embodiments, the command is generated during the write-back operation, wherein the write-back operation is to write a third portion of data into the cache to replace the first portion of data. In embodiments, the process includes to later store, in the primary storage device, a fourth portion of data. In embodiments, the fourth portion of data later stored in the primary storage device includes a copy of the third portion of data that is stored in the cache.

In embodiments, the command informs a primary memory device of storage locations that include invalid data and allows the primary storage device to implement a trim command. In embodiments, the trim command includes a TRIM or an UNMAP or a Deallocate command that causes the primary storage device to further implement a series of operations to free storage locations and/or otherwise manage a storage capacity of the primary storage device. As noted previously, in some embodiments, the primary storage device comprises a multi-level-per-cell memory device. In embodiments, the primary storage device includes a single-level per cell (SLC) and multi-level per cell (MLC) regions, and the SLC region may include an internal buffer. Accordingly, in embodiments, implementing the TRIM or the UNMAP or the Deallocate command further includes removing invalid data from storage locations in an internal buffer or an internal cache of the primary storage device.

Figure 7:
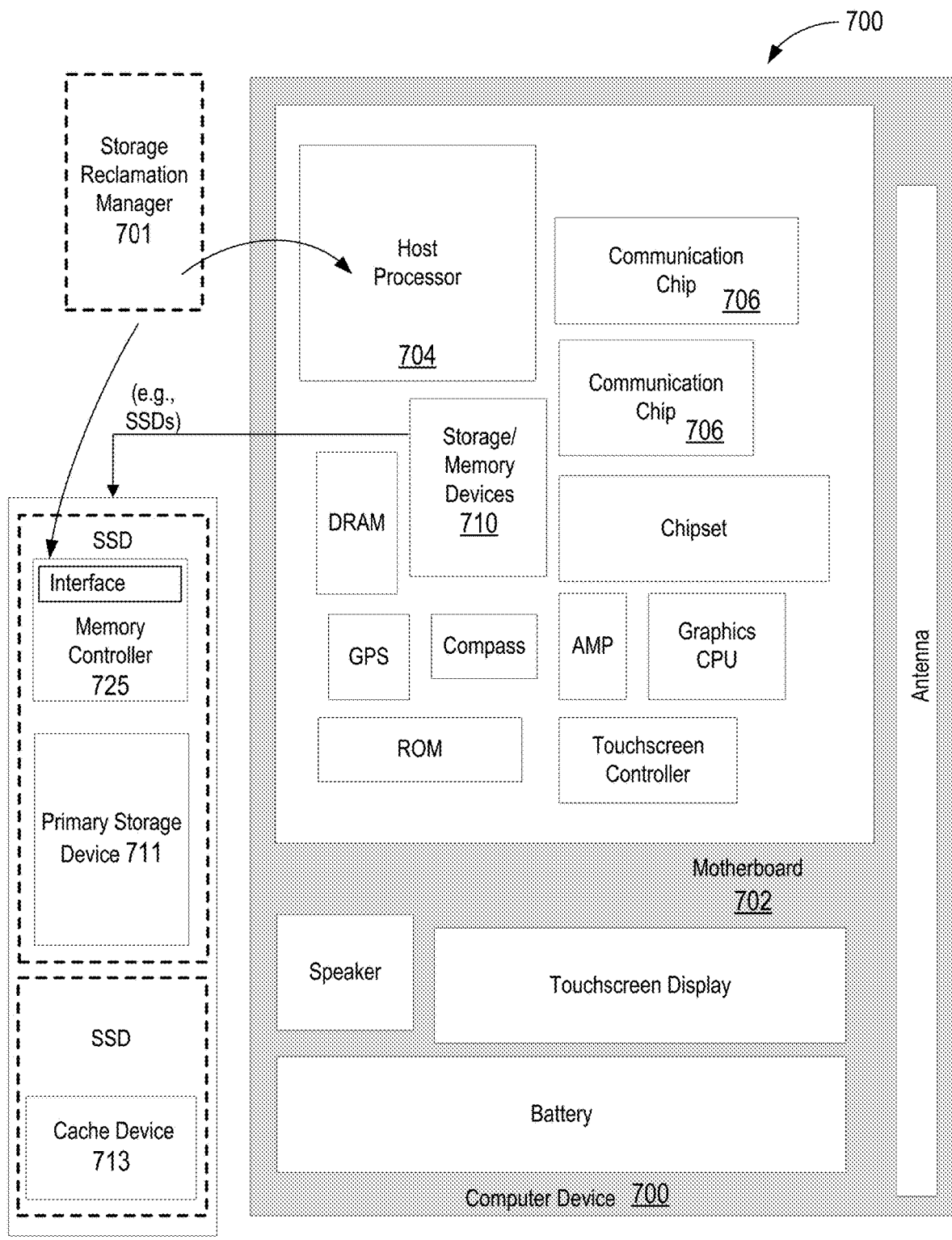
FIG. 7 is a diagram of a computer system or device associated with embodiments of FIGS. 3-6 in accordance with embodiments of the present disclosure.

Next, FIG. 7 illustrates an example computer system or computer device 700 that may include components corresponding to and/or implementing various methods related to the embodiments of FIGS. 3-6. Computer device 700 may include more or fewer components and may implement a storage reclamation manager 701 to generate a storage reclamation command and that is communicatively coupled with a cache and a primary storage device, as discussed in connection with FIGS. 3-6. In embodiments, computer device 700 houses a board 702, such as, for example, a motherboard. The board 702 may include a number of components, including but not limited to processor 704 and at least one communication chip 706. The processor 704 is physically and electrically coupled to the board 702. In some implementations, the at least one communication chip 706 is also physically and electrically coupled to the board 702. In further implementations, the communication chip 706 is part of the processor 704. In embodiments, computer device 700 includes storage/memory device 710 that may include any suitable non-volatile or volatile memory and in embodiments includes one or more primary storage devices 711 (e.g., primary storage 305 and 405 of FIGS. 3 and 4). In embodiments, a cache device 713 performs storage acceleration functions or operations similar to, e.g., cache device 403 of FIGS. 4 and 5.

In embodiments, primary storage device 711 receives a storage reclamation command from a storage reclamation manager 701 to perform similar operations to storage reclamation manager 301 and 401, as described above in connection with FIGS. 3-6. In embodiments, a memory controller 725 of a primary storage device 711 may receive the storage reclamation command and assist in implementation of the storage reclamation command in primary storage device 711. In embodiments, processor 704 implements storage reclamation manager 701 and accesses computational logic associated with the storage reclamation manager located in any suitable memory of computer device 700, including storage/memory devices 710. Depending on its applications, computer device 700 may include other components that may or may not be physically and electrically coupled to the board 702. These other components include, but are not limited to, volatile memory (e.g., DRAM, that may also include cache device 713 and/or be included in storage/memory devices 710), non-volatile memory (e.g., read-only memory or ROM), other flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

Note that in some embodiments, storage reclamation manager 701 is implemented within storage/memory devices 710 themselves. For example, in embodiments, storage/memory devices 710 include, e.g., a SSD, including a memory controller 725 including its own processor to generate a storage reclamation command, without outside assistance to assist in management of a storage capacity of the primary storage device and as described in connection with FIGS. 3-6 above. In embodiments, memory controller 725 includes an interface to receive a command from a host related to write or read commands, e.g., a trim or unmap command or other storage optimization command.

The communication chip 706 may enable wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 includes an integrated circuit die packaged within the processor 704. In some implementations of the invention, the integrated circuit die of the processor includes one or more devices, such as MOS-FET transistors built in accordance with implementations of the invention. The term "processor" may refer to any device or portion of a device that processes electronic data from registers and/or memory to transform that electronic data into other electronic data that may be stored in registers and/or memory.

The communication chip 706 also includes an integrated circuit die, e.g., die described in connection with the above embodiments, packaged within the communication chip 706. In accordance with another implementation of the invention, the integrated circuit die of the communication chip 706 includes one or more devices, such as MOS-FET transistors built in accordance with implementations of the invention.

In further implementations, another component housed within the computing device 700 may contain an integrated circuit die that includes one or more devices, such as MOS-FET transistors built in accordance with implementations of the invention.

In various implementations, the computing device 700 may be a laptop, a netbook, a notebook, an ultrabook, a smartphone, a tablet, a personal digital assistant (PDA), an ultra mobile PC, a mobile phone or other mobile device, a desktop computer, a server, a printer, a scanner, a monitor, a set-top box, an entertainment control unit, a digital camera, a portable music player, or a digital video recorder. In further implementations, the computing device 700 may be any other electronic device that processes data. In embodiments, the primary storage device includes a multi-level per cell (MLC) NAND device and includes single-level cell (SLC) and MLC regions. In embodiments, the SLC region comprises an internal cache or write buffer. In embodiments, the primary storage device includes rotational magnetic media.

Figure 8:
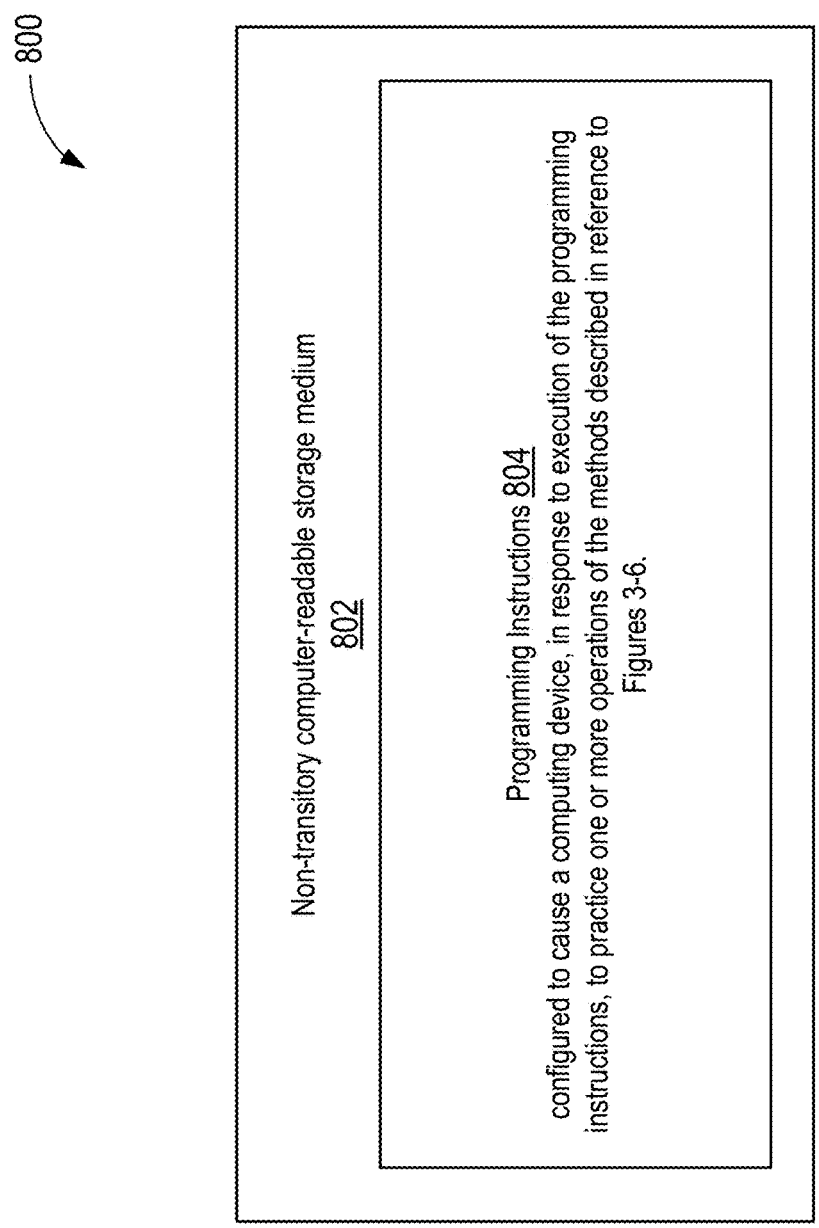
FIG. 8 illustrates an example storage medium with instructions configured to enable an apparatus or system to practice the present disclosure, in accordance with various embodiments.

Referring now to FIG. 8, wherein an example non-transitory computer-readable storage medium having instructions configured to practice all or selected ones of the operations associated with generation or implementation of a storage reclamation command to assist in management of a storage capacity of the primary storage device, earlier described, in accordance with various embodiments, is shown. As illustrated, non-transitory computer-readable storage medium 802 may include the executable code of a number of programming instructions 804 (or data to create the programming instructions). Executable code of programming instructions 804 may be configured to enable a system, e.g., computing system or computer device 700, in response to execution of the executable code/programming instructions, to perform, e.g., various operations associated with FIGS. 3-6. In alternate embodiments, executable code/programming instructions 804 (or data to create the instructions) may be disposed on multiple non-transitory computer-readable storage medium 802 instead. In still other embodiments, executable code/programming instructions 804 (or data to create the instructions) may be encoded in transitory computer-readable medium, such as signals.

In embodiments, a processor may be packaged together with a computer-readable storage medium having some or all of executable code of programming instructions 804 (or data to create the instructions) configured to practice all or selected ones of the operations earlier described with references to FIGS. 3-6. For one embodiment, a processor may be packaged together with such executable code 804 (or data to create the code) to form a System in Package (SiP). For one embodiment, a processor may be integrated on the same die with a computer-readable storage medium having such executable code 804 (or data to create the code). For one embodiment, a processor may be packaged together with a computer-readable storage medium having such executable code 804 (or data to create the code) to form a System on Chip (SoC). For at least one embodiment, the SoC may be utilized in, e.g., computing device 700.

In various embodiments, the programming instructions or program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make it directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (or the data to create the program code) such as that described herein. In another example, the program code (or data to create the program code) may be stored in a state in which it may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. Thus, the disclosed program code (or data to create the program code) are intended to encompass such machine-readable instructions and/or program(s) (or data to create such machine-readable instruction and/or programs) regardless of the particular format or state of the machine-readable instructions and/or program(s) when stored or otherwise at rest or in transit.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Note that primary embodiments include software or firmware implementations; however, as noted throughout the Description, hardware implementations are contemplated as well.

FIG. 9 is a diagram of a solid-state drive (SSD) 900 that may be included in embodiments of the disclosure. For example, in embodiments, cache devices 303 and 403 and/or primary storage device 305 and 405 of respective FIG. 3 and FIG. 4 may include one or more SSDs 900. As shown, in embodiments, an SSD includes a solid-state memory device 901 coupled to a controller 903 that includes a host interface 905 to receive a command or otherwise interface with, e.g., host or platform device 350 of FIG. 1. In some embodiments, host interface 905 receives a storage reclamation command from a storage reclamation manager (e.g., storage reclamation manager 301 or 401 of respective FIG. 3 or FIG. 4) to allow controller 903 (e.g., firmware of controller 903) to perform or implement operations in connection with a trim command from or associated with storage reclamation manager 301 and 401.

Accordingly, solid-state memory device 901 of SSD 900 includes any suitable solid-state state memory device for storing, e.g., data associated with the write-back operations of FIGS. 3-6. In some embodiments, solid-state storage device 901 includes e.g., a NAND device, e.g. 3D TLC (triple-level per cell) or QLC (quad-level per cell) NAND device. In some embodiments, the SSD may include a RAM with, e.g., batteries as integrated power sources to retain data for a certain time after external power is lost. In various embodiments, hybrid drives or solid-state hybrid drives (SSHDs) that combine features of SSDs and hard disk drives (HDDs) in a unit may be contemplated.

In embodiments, solid state memory device 901 of SSD 900 includes any suitable persistent memory, e.g., a write-in-place byte addressable non-volatile memory. In embodiments, SSD 900 includes any suitable memory that stores data by changing the electrical resistance of the memory cells. In embodiments, SSD 900 can also include a byte-addressable write-in-place three dimensional crosspoint memory device, or other byte addressable write-in-place NVM device, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Figure 10:
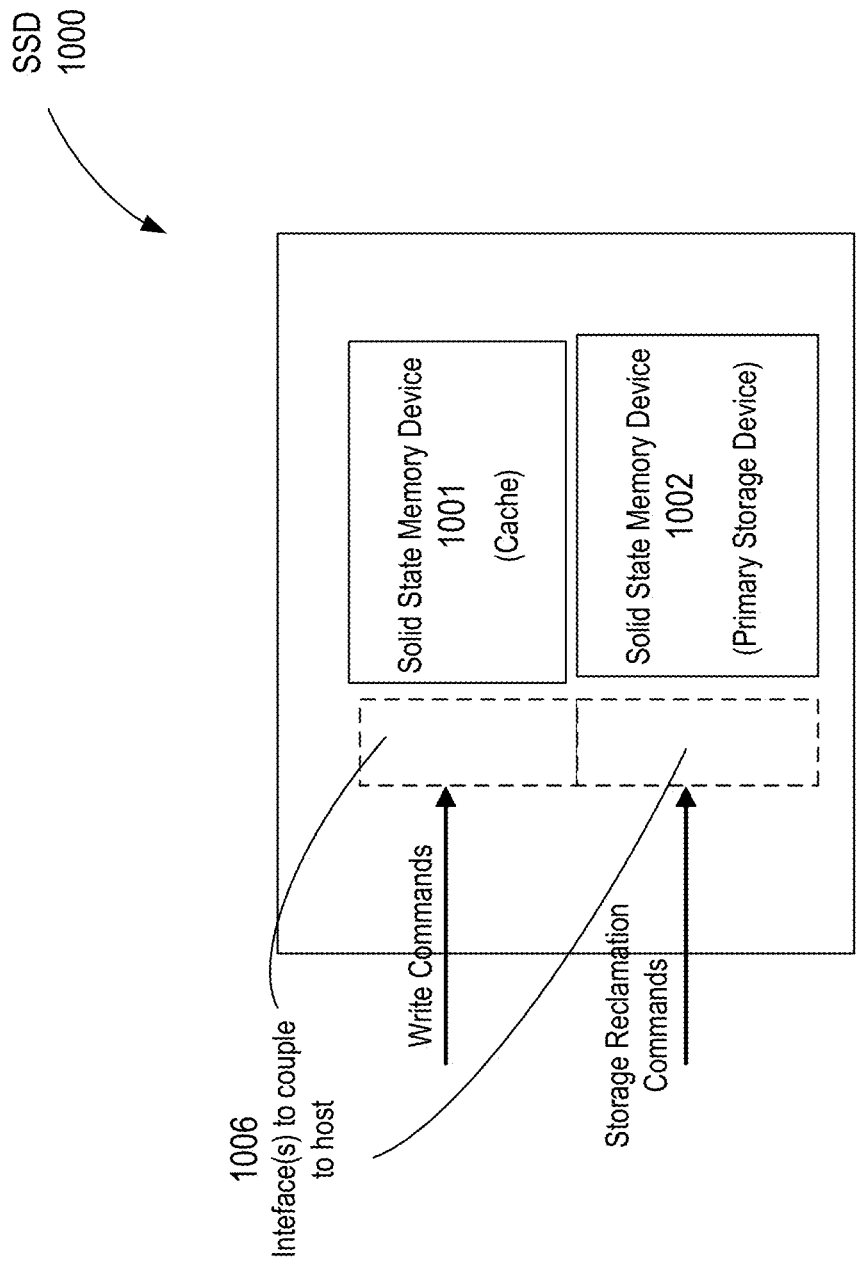
FIG. 10 illustrates another example solid-state drive (SSD) that includes the cache memory device and primary storage device of FIGS. 3-5, accordance with embodiments of the present disclosure.

FIG. 10 is a diagram of another solid-state drive (SSD) 1000 that may be included in embodiments of the disclosure. In embodiments, SSD 1000 includes both a solid-state memory device 1001 as a cache device and a solid-state memory device 1002 as a primary storage device. As shown, in embodiments, solid-state memory device 1001 and solid-state memory device 1002 are coupled to a host interface 1006 to receive a command or otherwise interface with, e.g., host or platform device 350 of FIG. 1. In some embodiments, host interface 1006 receives a storage reclamation command from a storage reclamation manager (e.g., storage reclamation manager 301 or 401 of respective FIG. 3 or FIG. 4) to allow interface(s) 1006 to perform or implement operations in connection with a trim command, unmap, or other storage optimization command from or associated with, e.g., storage reclamation manager 301 and 401. In other embodiments, as discussed previously in connection with FIG. 7, storage reclamation manager is implemented within host interface 1006 (e.g., memory controller including a processor and host interface 1006) itself. Note that solid-state memory device 1001 and solid-state memory device 1002 may include any suitable persistent memory or media as described above in connection with solid state memory device 901 of SSD 900 of FIG. 9.

According to various embodiments, the present disclosure describes a number of examples.

Example 1 is an apparatus, comprising a storage reclamation manager communicatively coupled with a cache that stores a first portion of data, and a primary storage device that stores a corresponding second portion of data, to during a write-back operation of a third portion of data into the cache, generate a command to the primary storage device to assist in reclamation of storage locations in which the second portion of data is stored, to assist in management of a storage capacity of the primary storage device.

Example 2 is the apparatus of Example 1, wherein the storage reclamation manager comprises a processor coupled to the primary storage device and the cache and wherein to assist in reclamation of the storage locations comprises to indicate the storage locations as including invalid data.

Example 3 is the apparatus of Example 2, wherein the second portion of data includes a copy of the first portion of data and the third portion of data is to modify or replace the first portion of data in the cache.

Example 4 is the apparatus of Example 3, wherein upon completion of the write-back operation of the third portion of data, the second portion of data stored in the primary storage device is indicated as invalid.

Example 5 is the apparatus of Example 4, wherein the command includes a trim command to free the storage locations by informing the primary storage device of addresses of the second portion of data that include invalid data.

Example 6 is the apparatus of Example 5, wherein a fourth portion of data to correspond to the third portion of data is to be stored in the primary storage device at a designated time after the write-back operation.

Example 7 is the apparatus of Example 1, wherein the command includes an unmap command to be applied to the second portion of data.

Example 8 is the apparatus of any one of Examples 1-7, wherein a fourth portion of data is later to be stored in the primary storage device and includes a copy of the third portion of data that is stored in the cache.

Example 9 is a method to assist in management of a storage capacity of a primary storage device, comprising receiving, by a storage reclamation manager, a request for a write-back operation, wherein the storage reclamation manager is communicatively coupled with a cache that stores a first portion of data, and the primary storage device that stores a corresponding second portion of data; and generating, by the storage reclamation manager, a command to assist the primary storage device in reclamation of storage locations in which the second portion of data is stored, wherein the command is generated during the write-back operation and wherein the write-back operation is to write a third portion of data into the cache to replace the first portion of data.

Example 10 is method of Example 9, wherein the first portion of data includes a copy of the second portion of data.

Example 11 is the method of Example 9, wherein the command is to free the storage locations by informing the primary storage device that the second portion of data includes invalid data.

Example 12 is the method of Example 11, further comprising to later store, by the storage reclamation manager, a fourth portion of data in the primary storage device, wherein the fourth portion of data includes a copy of the third portion of data that is stored in the cache.

Example 13 is the method of Example 9, wherein generating, by the storage reclamation manager, the command comprises generating a trim command.

Example 14 is the method of Example 13, wherein generating, by the storage reclamation manager, the trim command includes generating a command to remove invalid data from storage locations in a write buffer or an internal cache of the primary storage device and wherein the primary storage device comprises a multi-level-per-cell (MLC) memory device or rotational media.

Example 15 is the method of Example 14, wherein generating, by the storage reclamation manager, the trim command includes generating a command to implement a series of operations to manage the storage capacity of the primary storage device.

Example 16 is an apparatus comprising means to perform any one of the methods of Examples 9-15 or other example herein.

Example 17 is an apparatus, comprising a host interface to couple the apparatus with a host device; and a processor coupled to the host interface, wherein the processor is to receive a command from the host interface to reclaim storage in a primary storage device coupled to the processor, wherein the command is generated by a storage reclamation manager that is communicatively coupled with a cache that stores a first portion of data and the primary storage device that stores a corresponding second portion of data, during a write-back operation of a third portion of data into the cache, wherein the command assists in reclamation of storage locations in which the second portion of data is stored, to assist in management of a storage capacity of the primary storage device.

Example 18 is the apparatus of Example 17, wherein the apparatus is the primary storage device and including a memory controller and wherein to assist in reclamation of the storage locations comprises to indicate the storage locations as including invalid data.

Example 19 is the apparatus of Example 18, wherein the second portion of data includes a copy of the first portion of data and the third portion of data is to modify or replace the first portion of data in the cache.

Example 20 is the apparatus of Example 19, wherein upon completion of the write-back operation of the third portion of data, the second portion of data stored in the primary storage device is indicated as invalid.

Example 21 is the apparatus of Example 20, wherein the command includes a trim command that frees the storage locations by indicating addresses of the second portion of data that include invalid data.

Example 22 is the apparatus of Example 21, wherein a fourth portion of data to correspond to the third portion of data is to be stored in the primary storage device at a designated time after the write-back operation.

Example 23 is the apparatus of Example 17, wherein in response to the command, the processor is to assist in removal of the second portion of data from a memory page of the primary storage device.

Example 24 is a system, comprising a processor; a primary storage device coupled to the processor; and a storage reclamation manager to be operated by the processor to, during performance of operations associated with a write-back operation where a cache device communicatively coupled with the processor stores a first portion of data and the primary storage device stores a corresponding second portion of data, during a write-back operation of a third portion of data into the cache device, generate a command to assist in reclamation of storage locations in which the second portion of data is stored, to assist in management of a storage capacity of the primary storage device.

Example 25 is the system of Example 24, further including the cache device and wherein the cache device comprises a non-volatile memory (NVM) device including a cross-point memory array.

Example 26 is the system of Example 24, wherein the primary storage device includes a multi-level per cell (MLC) NAND device.

Example 27 is the system of Example 24, wherein to generate the command to assist in reclamation of storage locations includes to generate a command to inform the primary storage device of storage locations that include invalid data.

Example 28 is the system of any one of Examples 24-27, wherein the third portion of data is new data to be written to the cache device and wherein corresponding invalid data of the second portion of data of the primary storage device is to be later rewritten at a designated time.

Example 29 is a solid state drive (SSD), comprising a primary storage including a first solid state memory device; a cache including a second solid state memory device; and a host interface to couple the primary storage and the cache with a host device, wherein the primary storage is to receive a command from the host interface to reclaim storage in the primary storage and wherein the command is generated by a storage reclamation manager that is communicatively coupled with both the primary storage and the cache, to assist in reclamation of storage locations in the cache during a write-back operation, to assist in management of a storage capacity of the primary storage.

Example 30 is the SSD of Example 29, wherein, the cache stores a first portion of data and the primary storage stores a corresponding second portion of data, and the write back operation to occur during a write-back operation of a third portion of data into the cache and wherein the command assists in reclamation of storage locations in which the second portion of data is stored.

Example 31 is the SSD of Example 30, wherein to assist in reclamation of the storage locations comprises to indicate the storage locations as including invalid data.

Example 32 is the SSD of Example 31, wherein the second portion of data includes a copy of the first portion of data and the third portion of data is to modify or replace the first portion of data in the cache.

Example 33 is the SSD of Example 32, wherein upon completion of the write-back operation of the third portion of data, the second portion of data stored in the primary storage is indicated as invalid.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to specific implementations disclosed in the specification and the claims. Rather, the scope is to be determined entirely by the following claims, which are to be construed in accordance with established doctrines of claim interpretation.

What is claimed is:

1. An apparatus, comprising:
a storage reclamation manager communicatively coupled with a cache that stores a first portion of data, and
a primary storage device that stores a corresponding second portion of data, to, during a write-back operation of a third portion of data into the cache, generate a command to the primary storage device to assist in reclamation of storage locations in which the second portion of data is stored, to assist in management of a storage capacity of the primary storage device, wherein the command is to free the storage locations by informing the primary storage device that the second portion of data includes invalid data and wherein a fourth portion of data is later to be stored in the primary storage device and includes a copy of the third portion of data that is stored in the cache.

2. The apparatus of claim 1, wherein the storage reclamation manager comprises a processor coupled to the primary storage device and the cache and wherein to assist in reclamation of the storage locations comprises to indicate the storage locations as including invalid data.

3. The apparatus of claim 2, wherein the second portion of data includes a copy of the first portion of data and the third portion of data is to modify or replace the first portion of data in the cache.

4. The apparatus of claim 3, wherein upon completion of the write-back operation of the third portion of data, the second portion of data stored in the primary storage device is indicated as invalid.

5. The apparatus of claim 4, wherein the command includes a trim command to free the storage locations by informing the primary storage device of addresses of the second portion of data.

6. The apparatus of claim 5, wherein the fourth portion of data to correspond to the third portion of data is to be stored in the primary storage device at a designated time after the write-back operation.

7. The apparatus of claim 1, wherein the command includes an unmap command to be applied to the second portion of data.

8. A method to assist in management of a storage capacity of a primary storage device, comprising:
receiving, by a storage reclamation manager, a request for a write-back operation, wherein the storage reclamation manager is communicatively coupled with a cache that stores a first portion of data, and the primary storage device that stores a corresponding second portion of data; and
generating, by the storage reclamation manager, a command to assist the primary storage device in reclamation of storage locations in which the second portion of data is stored, wherein the command is generated during the write-back operation and wherein the write-back operation is to write a third portion of data into the cache to replace the first portion of data, wherein the command is to free the storage locations by informing the primary storage device that the second portion of data includes invalid data and wherein the storage reclamation manager is to later store a fourth portion of data in the primary storage device, wherein the fourth portion of data includes a copy of the third portion of data that is stored in the cache.

9. The method of claim 8, wherein the first portion of data includes a copy of the second portion of data.

10. The method of claim 8, wherein generating, by the storage reclamation manager, the command, comprises generating a trim command.

11. The method of claim 10, wherein generating, by the storage reclamation manager, the trim command includes generating a command to remove invalid data from storage locations in a write buffer or an internal cache of the primary storage device and wherein the primary storage device comprises a multi-level-per-cell (MLC) memory device or rotational media.

12. The method of claim 10, wherein generating, by the storage reclamation manager, the trim command includes generating a command to implement a series of operations to manage the storage capacity of the primary storage device.

13. A solid state drive (SSD), comprising:
a primary storage including a first solid state memory device;
a cache including a second solid state memory device; and
a host interface to couple the primary storage and the cache with a host device, wherein the primary storage is to receive a command from the host interface to reclaim storage in the primary storage and wherein the command is generated by a storage reclamation manager that is communicatively coupled with both the primary storage and the cache, to assist in reclamation of storage locations during a write-back operation, to assist in management of a storage capacity of the primary storage, wherein the cache stores a first portion of data and the primary storage stores a corresponding second portion of data and a write back operation is to occur during a write-back operation of a third portion of data into the cache and wherein the command to assist in reclamation of storage locations in which the second portion of data is stored and the command is to free the storage locations by informing the primary storage device that the second portion of data includes invalid data and wherein a fourth portion of data is later to be stored in the primary storage device, wherein the fourth portion of data includes a copy of the third portion of data that is stored in the cache.

14. The SSD of claim 13, wherein the second portion of data includes a copy of the first portion of data and the third portion of data is to modify or replace the first portion of data in the cache.

15. The SSD of claim 14, wherein upon completion of the write-back operation of the third portion of data, the second portion of data stored in the primary storage is indicated as invalid.

* * * * *